United States Patent [19]

Karydas et al.

[11] Patent Number: 5,057,377

[45] Date of Patent: Oct. 15, 1991

[54] FLUORINATED SILICON POLYMERS

[75] Inventors: Athanasios Karydas, New York; Juliana Rodgers, Staten Island, both of N.Y.

[73] Assignee: Ciba-Geigy Corporation, Ardsley, N.Y.

[21] Appl. No.: 556,936

[22] Filed: Jul. 23, 1990

Related U.S. Application Data

[63] Continuation-in-part of Ser. No. 523,962, May 16, 1990, abandoned.

[51] Int. Cl.$^5$ ............................................. B32B 9/04
[52] U.S. Cl. ...................................... 428/447; 528/28; 525/440; 525/453; 525/460; 525/474
[58] Field of Search ................. 528/28; 525/440, 453, 525/460, 474; 428/447

[56] References Cited

U.S. PATENT DOCUMENTS

| | | | |
|---|---|---|---|
| 4,098,742 | 7/1978 | Muellar | 528/28 |
| 4,873,306 | 10/1989 | Wehowsky | 528/28 |
| 4,935,480 | 6/1990 | Zdrahala | 528/28 |

*Primary Examiner*—Melvyn I. Marquis
*Assistant Examiner*—Margaret W. Glass
*Attorney, Agent, or Firm*—George R. Dohmann; Edward McC. Roberts

[57] ABSTRACT

This invention relates to polymeric compositions derived by the polycondensation of heteroatom containing perfluoroalkyl terminated neopentyl glycols, and diamino, dihydroxy, or dimercapto-polysiloxanes and optionally other diols, dimercaptans or diamines with organic diisocyanates; and blends of polycondensation polymers with oxime-blocked organic polyisocyanates. These compositions and blends are useful as coatings on glass, wood, paper, leather and especially textiles.

18 Claims, No Drawings

FLUORINATED SILICON POLYMERS

BACKGROUND OF THE INVENTION

This application is a continuation-in-part of application Ser. No. 523,962, filed on May 16, 1990, now abandoned.

Fluorine containing polymers have been extensively used to make oil and water repellent coatings on various substrates, primarily en textiles.

Polyaddition polymers as well as polycondensates have been prepared for this purpose. The perfluoroalkyl groups of these polymers impart such low free surface energies to coated surfaces that not only water, but also organic liquids ar unable to wet them. Heptane, for instance, with a surface tension of 17 [dynes/cm] will not wet a coating with a surface energy lower than that; surfaces consisting of more or less densely packed perfluoroalkyl groups have free surface energies between 10 and 15 [dynes/cm]. Only very small amounts of fluorine are needed to prepare such surfaces. Therefore, perfluoroalkyl group-containing textile finishes have, despite their greater material cost, replaced to a great extent silicone based water repellents for textile applications.

Silicon based water repellents have, up to the arrival of fluoro-chemicals, dominated the market for water repellents for textiles. They are still used in application, where only water repellency, no oil repellency, is more important and where the exceptionally smooth hand thy impart is desired.

Attempts to combine both types of finish in one application with the goal to get high oil and water repellency together with a soft, smooth hand, have failed, because of the inherent incompatibility of $R_f$-substituted polymers and polysiloxanes in combination textile finishes. In such combinations of the art, the oil repellency of the fluoro-polymer was lost or seriously diminished by combination with polysilicones.

The combination of siloxane units and fluorine in one molecule for textile applications has been described in U.S. Pat. No. 3,331,813 and 3,903,128.

In both cases, Si and F are combined in one monomeric unit and fluoroalkyl groups are attached directly to a polysiloxane backbone, covering up in effect the Si atoms. As a result, neither oil repellency nor water repellency is optimized.

U.S. Pat. No. 4,098,742 describes polyurethanes which contain at least one segment derived from a perfluoroalkyl-substituted diol and at least one segment derived from a reactive hydrogen containing polysiloxane, synthesized by co-polycondensation with an organic diisocyanate. However, this reference does not teach or suggest polyurethanes possessing the bis-$R_f$ containing isocyanato-reactive neopentyleneoxy units or oligomers thereof, as described by the present invention.

It is an object of the present invention to provide stable urethane containing polymers possessing oleophobic and hydrophobic fluoroalkyl segments of bis-$R_f$ containing isocyanato-reactive neopentyleneoxy units, or oligomers thereof, and segments of an isocyanato-reactive hetero-terminated polysiloxane, said segments linked through an organic di-isocyanato group.

It is a further object of the present invention to provide stable oleophobic and hydrophobic coatings of such urethane containing polymers on substrates, particularly glass, ceramic, masonry, wood, paper, metal, leather and preferably textile substrates, to which such coatings impart a high degree of oil and water repellency. Such coatings are preferably treated by the urethane coatings with a crosslinking amount of a polyisocyanate, preferably a blocked polyisocyanate.

DETAILED DESCRIPTION OF THE INVENTION

One embodiment of the present invention relates to urethane containing polymers comprising about 5% to about 70% by weight of perfluoroalkyl segments of bis-$R_f$ containing neopentyleneoxy units and about 20–95% by weight of siloxane segments, wherein the perfluoroalkyl containing segment is selected from those of the structure:

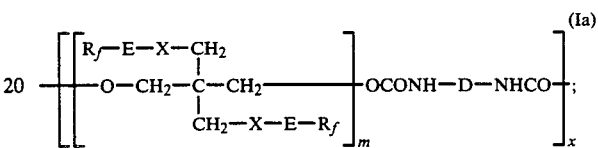

and the siloxane-containing segment is selected from those of the structure:

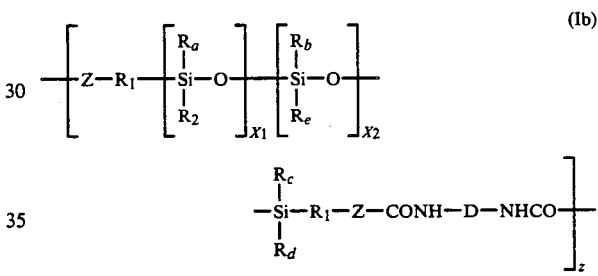

wherein $R_f$ is a straight or branched chain perfluoroalkyl up to 18 carbon atoms or said perfluoroalkyl substituted by perfluoroalkoxy of 2 to 6 carbon atoms, or mixtures thereof;

E is straight or branched chain alkylene of 1 to 10 carbon atoms or said alkylene interrupted by one to three groups independently selected from the group consisting of —NR—, —O—, —S—, —COO—, —OOC—, —CONR—, —NRCO—, —SO₂NR— and NRSO₂—, or terminated at the $R_f$ end with —CONR— or —SO₂NR— where such $R_f$ is attached to the respective carbonyl carbon or sulfur atom thereof and X is —SO₂— or —NR—; or E is a direct bond and X is —CONR— or —SO₂NR where $R_f$ is attached to the respective carbonyl carbon or sulfur atom thereof, and R is independently hydrogen, alkyl of 1 to 6 carbon atoms or hydroxyalkyl of 2 to 6 carbon atoms; m is 1–3 and x is 1 to 20, Z is —O—, —S— or —NR₄— where R₄ is hydrogen or lower alkyl; R₁ is straight or branched chain alkylene of up to 6 carbon atoms which may be interrupted by —N(R)— where R is defined above, or is a polyoxyalkylene group of the formula

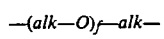

where alk is straight or branched chain alkylene of 2 to 4 carbon atoms and f is an integer of 1 to about 50, R₂, R_a, R_b, R_c, R_d and R_e are straight or branched chain alkyl of up to 18 carbon atoms, alkoxy of up to 5 carbon atoms, phenyl or aralkylene of 7 to 19 carbon atoms. X₁ and $X_2$ are integers from 1 to 500 with the proviso that $X_1+X_2$ is 5 to 1300, and z is 1 to 20; and D is the residue of an aromatic, aliphatic, cycloaliphatic or araliphatic diisocyanate.

The heteroatom containing $R_f$-neopentyl glycols useful in preparing the instant polymers preferably have the general formula Ia or IIa

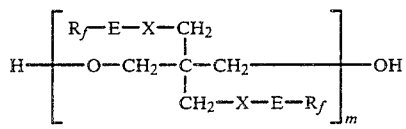
(IIa)

or

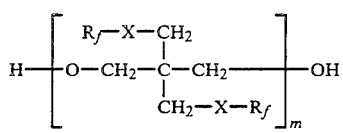
(IIb)

wherein $R_f$ is a straight or branched chain perfluoroalkyl of up to 18 carbon atoms or said perfluoroalkyl substituted by perfluoroalkoxy of 2 to 6 carbon atoms, or mixtures thereof.

E is branched or straight chain alkylene of 1 to 10 carbon atoms or said alkylene interrupted by one to three groups independently selected from the group consisting of —NR—, —O—, —S—, —SO$_2$—, —COO—, —OOC—, —CONR—, —NRCO—, —SO$_2$NR—, and —NRSO$_2$—, or terminated at the $R_f$ end with —CONR— or —SO$_2$NR—, where $R_f$ is attached to the carbon or sulfur atom, and for formula Ia, X is —S—, —O—, —SO$_2$—, or —NR—, and for formula IIa, X is —CONR— or —SO$_2$NR—, where $R_f$ is attached to the carbon or sulfur atom, and where R is independently hydrogen, alkyl of 1 to 6 carbon atoms or hydroxyalkyl of 2 to 6 carbon atoms, and m is 1, 2, or 3.

It is understood that the R group in the polymeric segment (formula Ia), and in the corresponding glycols of formulae IIa and b preferably represents a mixture of perfluoroalkyl moieties. When the $R_f$ group is identified as having a certain number of carbon atoms said $R_f$ group also usually concomitantly contains a small fraction of perfluoroalkyl groups with a lower number of carbon atoms and a small fraction of perfluoroalkyl groups with a higher number of carbon atoms.

Preferably the instant segments of formula Ia are those where $R_f$ is perfluoroalkyl of 4 to 12 carbon atoms or perfluoroalkyl of 2 to 6 carbon atoms substituted by perfluoroalkoxy of 2 to 6 carbons, E is alkylene of 2 to 6 carbon atoms, —CONHCH$_2$CH$_2$—, —CH$_2$CH$_2$N(CH$_3$)CH$_2$CH$_2$—, —CH$_2$CH$_2$SO$_2$NHCH$_2$CH$_2$—, —CH$_2$CH$_2$OCH$_2$CH$_2$—, or —SO$_2$NHCH$_2$CH$_2$—, X is —S—, —SO$_2$— or —O—, and m is 1 or 2.

Most preferred are those segments of formula Ia where $R_f$ is perfluoroalkyl of 6 to 12 carbon atoms, E is ethylene, m=1, and X is S, i.e. those derived from glycols of the formula $(R_fCH_2CH_2SCH_2)_2C(CH_2OH)_2$ In another group of most preferred segments of formula Ia are those wherein $R_f$ is perfluoroalkyl of 6 to 12 carbon atoms, E is ethylene, m=2, and X is S, i.e. those derived from glycols of the formula

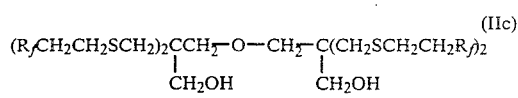
(IIc)

Diols useful in the preparation of the instant polymers can be prepared as described in detail in U.S. application Ser. No. 209,743. filed June 16, 1988, now U.S. Pat. No. 4,898,981.

The difunctional polysiloxanes useful in preparing the segments of formula Ib have the general structure III

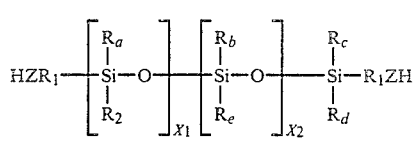
(III)

wherein $R_1$ is a linear or branched alkylene group up to 6 carbon atoms which may be interrupted by —N(R)— where R is as defined above or is a polyoxyalkylene group as defined above, and preferably of structure IV or V $-[CH_2CHO]_f-CH_2CH-$
     |              |
     $R_3$           $R_3$    (IV)

$+CH_2CH_2CH_2CH_2O]_fCH_2CH_2CH_2CH_2-$    (V)

wherein $R_3$ is hydrogen or methyl and f is an integer from 1 to about 50, $R_2$, $R_a$, $R_b$, $R_c$, $R_d$ and $R_e$ are independently linear or branched alkyl with 1 to 18 carbon atoms, alkoxy of 1 to 5 carbon atoms, phenyl or aralkylene of 7 to 19 carbon atoms, $X_1$ and $X_2$ are integers from 1 to 500 with the proviso that $X_1+X_2$ is 7 to 1300, Z is —O—, —S— or —NR$_4$—, wherein $R_4$ is hydrogen or lower (C$_1$ to C$_4$) alkyl.

The siloxane materials of formula III are, as a class, well known in the art.

Preferably $R_2$, $R_a$, $R_b$, $R_c$, $R_d$ and $R_e$ are alkyl of 1 to 4 carbon atoms, most preferably methyl, or are alkoxy of up to 4 carbon atoms, most preferably methoxy, $R_1$ is alkylene of up to 6 carbon atoms which may be interrupted by —N(R)— where R is independently hydrogen or alkyl of 1 to 6 carbon atoms most preferably hydrogen and $X_1+X_2$ is 5 to 100.

Isocyanates useful in the preparation of the instant polymers are those of the formula $D(NCO)_2$    (VI)

wherein D is the residue of an aromatic, aliphatic, cycloaliphatic, or aralphatic diisocyanate. Such diisocyanates are, as a class, well known in the art.

Preferred aliphatic, including cycloaliphatic, diisocyanates include those of general formula $D(NCO)_2$    (VIa)

where

D is straight or branched chain alkylene of 2 to 16 carbon atoms, optionally containing halo or cycloaliphatic functions, and further optionally interrupted by one to three groups independently selected from the group consisting of —NR—, —O—, —S—, —SO$_2$—, —COO—, —OOC—, —OCOO—; —CONR—, —NR- —CO—, —SO$_2$NR— and —NRSO$_2$ where R is as defined above.

Useful aliphatic or cycloaliphatic polyisocyanates include 1,2-ethane diisocyanate, 1,3-propano diisocyanates, 1,4-butane diisocyanate, 2-chloropropane-1,3-diisocyanate, pentamethylene diisocyanate, propylene-1,2-diisocyanates, 1,6-hexane diisocyanate, 1,8-octane diisocyanate, 1,10-decane diisocyanate, 1,12-dodecane diisocyanate, 1,16-hexadecane diisocyanate and other aliphatic diisocyanates such as 1,3-cyclohexane diisocyanate, 1,4-cyclohexane diisocyanate, cyclohexane triisocyanate, 4-4'-methylene bis(cyclohexyl isocyanate).

Additionally, the following diisocyanates are particularly preferred because urethane compositions made therefrom tend to be non yellowing:

1,6hexamethylene diisocyanate (HDI), 2,2,4- and 2,4,4-trimethyhexamethylene diisocyanate (TMDI), dimer acid derived diisocyanate (DDI) obtained from dimerized fatty acids, such as linoleic acid 4,4-dicyclohexylmethane diisocyanate (hydrogenated MDI), isophorone diisocyanate, 3-isocyanatomethyl-3,5,5-trimethylcyclohexyl diisocyanate, lysine methyl ester diisocyanate (LDIM), bis(2-isocyanatoethyl) fumarate (FDI), and bis(2-isocyanatoethyl) carbonate. Preferred araliphatic isocyanates include m-tetramethylxylylene diisocyanate (TMXDI) and isomers thereof.

Useful aromatic diisocyanates can be represented by the formula $$D(NCO)_2 \quad (VIb)$$

where

D is phenylene that is unsubstituted or substituted by on or two alkyl of 1 to 4 carbon atoms, alkoxy of 1 to 4 carbon atoms, chloro, bromo and nitro; naphthylene that is unsubstituted or substituted by on or two alkyl of 1 to 4 carbon atoms, chloro, bromo and nitro or where D is a group of formula

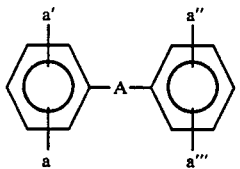

where

A is a direct bond, oxygen, methylene or ethylene and a, a', a" and a'" each independently are hydrogen, alkyl of 1 to 4 carbon atoms alkoxy of 1 to 4 carbon atoms, chloro or bromo.

Aromatic diisocyanates as described above include tolylene diisocyanate (T) (all isomers), 4,4'-diphenylmethane diisocyanate (MDI), tolidine diisocyanate, dianisidine diisocyanate, m-xylylene diisocyanate, p-phenylene diisocyanate, m-phenylene diisocyanate, 1-chloro-2,4-phenylene diisocyanate, 3,3'-dimethyl-4,4'-bisphenylene diisocyanate, 4,4'-bis(2-methylisocyanatophenyl)methane 4,4'-bisphenylene diisocyanate, 4,4'-bis(2-methoxyisocyanatophenyl)methane, 1-nitro-phenyl-3,5-diisocyanate, 4,4'-diisocyanatodiphenyl ether, 3,3'-dichloro-4,4'-diisocyanatodiphenyl ether, 3,3'-dichloro,4,4'-diisocyanato-diphenylmethane, 4,4'-diisocyanatodibenzyl, 3,3'-dimethoxy-4,4'-diisocyanatodiphenyl, 2,2-dimethyl-4,4'-diisocyanatodiphenyl, 2,2'-dichloro-5,5'-dimethoxy-4,4'-diisocyanatodiphenyl, 3,3'-dichloro-4,4'-diisocyanatodiphenyl, 4-chloro-1,2-naphthalene diisocyanate, 4-methyl-1,2-naphthalene diisocyanate, 1,5-naphthalene diisocyanate, 1,6-naphthalene diisocyanate, 1,7-naphthalene diisocyanate, 1,8-naphthalene diisocyanate, 4-chloro-1,8-naphthalene diisocyanate, 2,3-naphthalene diisocyanate, 2,7-naphthalene diisocyanate, 1,8-dinitro-2,7-naphthalene diisocyanates, 1-methyl-2,4-naphthalene diisocyanate, 1-methyl-5,7-naphthalene diisocyanate, 6-methyl-1,3-naphthalene diisocyanate, 7-methyl-1,3-naphthalene diisocyanate, polymethylene polyphenyl isocyanate and co-products of hexamethylene diisocyanate and tolylene diisocyanate.

Additional isocyanate components can be prepared by reacting an excess of a diisocyanate as described above with a suitable hydroxyl component, such as a polyol described below or an R$_f$glycol as described herein, or combination thereof, to obtain an isocyanate-terminated prepolymer.

The polyols useful in preparing such prepolymers well known in the urethane art and include:

Ethylene glycol 3-propanediol, 1,4-butanediol, 1,5-pentanediol, 1,6-hexanediol 1,9-nonanediol, 1,10-decanediol, di-, tri-, tetra- and pentaethylene glycol, bis(4-hydroxybutyl) ether, bis(2-hydroxyethyl) thioether, bis(4-hydroxybutyl) thioether, 1,4-bis(3-hydroxypropyl)benzene, glycerol trimethylolpropane, 1,2,6-hexanetriol, sorbitol, mannitol, pentaerythritol, 2-ethyl-1,3-butylene glycol, octamethylene glycol, 2-ethyl-1,3-hexanediol, dodecamethylene glycol, tetradecamethylene glycol, hexadecamethylene glycol, octadecamethylene glycol. Diols are preferred.

The polyol can contain cycloaliphatic groups, e.g. 1,4-cyclohexnediol, 1,4-bis(hydroxyethyl)cyclohexane, 4,4'-dihydroxyl-1,1'-dicyclohexyl and the like. If desired, mixtures of polyols can be used.

Polyols in addition to those described above, that are considered especially useful, are those containing tertiary nitrogen atoms which can be quaternized with acids, thereby converting a water-insoluble urethane composition into one that is water soluble or emulsifiable. Generally, an isocyanate-terminated prepolymer having a molecular weight of 200 to 10,000, preferably 400 to 4,000, is reacted with a difunctional tertiary amine to provide a segmented polymer containing tertiary nitrogen atoms. The nitrogen atoms can be quaternized, for example, by alkylation with methyl chloride or dimethyl sulfate to yield a composition that in polar media yields a dispersion in water. The polyammonium polyurethane compositions are obtained even more readily by neutralization of the basic polyurethane composition in a polar organic solvent such as acetone, methyl ethyl ketone, tetrhydrofuran, with a strong (HCl) or preferably weak (pK>4) acid such as the C$_2$–C$_9$ alkanoic acids. Acetic acid is especially preferred because the acetic acid evaporates with the water on drying to leave the water-insoluble hydrophobic starting polyurethane composition.

Some useful diols containing tertiary nitrogen atoms can be represented by the formula:

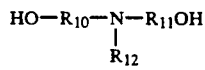

where

R$_{10}$ and R$_{11}$ are alkyl of 2 to 4 carbon atoms or a group of formula

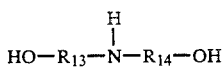

where
R₁₃ and R₁₄ are alkyl of 2 to 4 carbon atoms
R₁₂ is alkyl of 1 to 18 carbon atoms, cyclohexyl, tolyl, xylyl, naphthyl, or pyridyl.

Useful polyols that contain tertiary nitrogen atoms include the alkoxylated aliphatic cycloaliphatic aromatic and heterocyclic primary amines:

N-methyl-diethanolamine   N-butyl-diethanolamine N-oleyl-diethanolamine, N-cyclohexyl-diethanolamine, N-methyl-diisopropanolamine, N-cyclohexyl-diisopropanolamine, N,N-dihydroxyethylaniline, N,N-dihydroxyethyl-m-toluidine, N,N-dihydroxyethyl-p-toluidine, N,N-dihydroxypropyl-naphthylamine, N,N-tetrahydroxyethyl-aminopyridine, polyethoxylated butyldiethanolamine, polypropoxylated methyldiethanolamine (molecular wt. 1000), and polypropoxylated methyldiethanolamine (molecular wt. 2000); also useful are polyesters with tertiary amino groups, tri-2-hydroxypropyl-(1)-amine, N,N-di-n-(2,3-dihydroxypropyl)-amine, N,N'-bis-hydroxypropylethylenediamine, N,N'-dimethyl-N,N'-bis-(hydroxyethyl)-ethylenediamine, 11-stearyldiethanolamine.

The reaction between the isocyanate component and the active hydrogen component e.g. of formulae IIa, IIb and III can be carried out in bulk, i.e., without solvent, or in the presence of non-reactive, organic solvents. Solvent media in which the reaction can be carried out include ketones, such as acetone, methyl ethyl ketone and methyl isobutyl ketone; esters such as ethyl acetate, isopropyl acetate, butyl acetate, 2-ethylhexyl acetate; hydrocarbons such as hexane, heptane, octane and higher homologs, cyclohexane, benzene, toluene, xylene or blends of aliphatic, cycloaliphatic and aromatic hydrocarbons or aprotic solvents such as N-methylpyrrolidine; it is also possible to employ ethers, both aliphatic and alicyclic including di-n-propyl ether, dibutyl ether, tetrahydrofuran and the diethers of polyalkylene oxides. In addition, chlorinated solvents such as 1,1,1-tri-chloroethane, dichloroethyl ether, ethylene dichloride, perchloroethylene and carbon tetrachloride can be used.

Among the solvents listed, the water miscible solvents such as acetone and methyl ethyl ketone are advantageous as they conveniently simplify the conversion of R$_f$-urethanes into aqueous emulsions of R$_f$-urethanes if desired.

In all cases, the solvents should generally be anhydrous to avoid urea formation.

The reaction can, if desired, be catalyzed and those catalysts conventionally employed in the urethane art are useful herein. Useful catalysts fall principally in two groups
a. amino compounds and other bases, including:
triethylamine and other trialkylamines, triethylenediamine, 1,4-diaza-2,2,2-bicyclooctane, N-(lower)alkyl-morpholines, N,N,N',N'-tetramethylethylenediamine, N,N,N',N'-tetramethyl-1,3-butanediamine, substituted piperazines, dialkylalkanolamines benzyltrimethylammonium chloride and
b. organometallic and inorganic compounds, including:
cobalt naphthenate, stannous chloride, stannous octoate, stannous oleate, dimethyl tin dichloride, di-n-butyl-tin dilaurylmercaptide, tetra-n-butyl-tin, trimethyl-tin hydroxide, di-n-butyltin dilaurate and the like.

Such catalysts may be used singly or in combination with each other. Beneficial synergistic catalysis may occur when combinations are used.

While it is possible to carry out the reaction without the use of a catalyst, it is generally preferable for reasons of economy and to assure a complete reaction, to utilize one or more catalysts as listed in amounts ranging from 0.001 to 1% based on the weight of the reactants. It is similarly advantageous to carry out the urethane synthesis at elevated temperature, usually between room temperature and 120° C. and preferably at 60° C. to 80° C. to obtain a complete reaction between 0.5 to 8 hours reaction time, although temperatures between about $-20°$ C. to about 140° C. may be employed, depending upon the reactivity, etc. of the specific reactants employed.

The reaction can be easily followed by titration of the isocyanate group or by IR analysis.

Of course, one may employ a diisocyanate equivalent, such as an aliphatic, aromatic, cycloaliphatic or araliphatic di-carbamoyl halide or the like as diisocyanate precursors in the above reactions. In such cases it is desirable to use a base, e.g. a tertiary amine to remove liberated hydrogen halide.

The segments Ia and Ib of the polymers of the present invention can be built up to the requisite desired values of x and z, through techniques known in the art.

For example, the $R_f$ diol may be reacted with the diisocyanate, e.g. in a mole ratio of 1:2 to end-cap the diol with isocyanate, then react the end-capped product with diol in a mole ratio of 1:2 to obtain the $R_f$ segments of desired length. Alternatively, two moles of $R_f$ diol may be reacted with one mole of isocyanate and the product then end-capped with isocyanate, etc.

Similarly the segments of the siloxane (diol, dimercaptan or diamine) may be built up by reaction with diisocyanate in the same manner or with the $R_f$ diol. The two segments can then be joined by reaction of end capped isocyanate with the terminal diol, or mercaptan or amino groups as the case may be.

Alternatively, the siloxane or $R_f$ diol may be built up to the desired value of z or x, as the case may be, in the presence of excess diisocyanate, and the excess diisocyanate and isocyanate capped prepolymer reacted with $R_f$ diol, or siloxane in the mole ratio corresponding to the value of x or z, respectively.

All such reactions are preferably carried out under the reaction correlations specified above.

The polymers of the instant invention are preferably crosslinked, or cured through the use of conventional urethane polymer crosslinking or curing agents. Where the substrate contains active hydrogens, such as leather, cellulosic and polyamide containing textiles, the polymers are crosslinked together and to the substrate. Preferably, the crosslinking agent is in the form of a blocked polyisocyanate curing agent. Such curing agents are well known, per se, in the art.

For example the polycondensation polymers prepared from the monomers described above are then blended with crosslinking amount of a blocked polyisocyanate of formula VII.

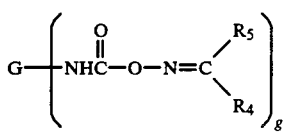

VII wherein g is 2 to 4, R₄ is as previously described, R₅ is lower (C₁-C₄) alkyl or phenyl and G is an organic linking group.

The preferred blocked isocyanates are prepared by reacting butanone oxime with the following triisocyanates:

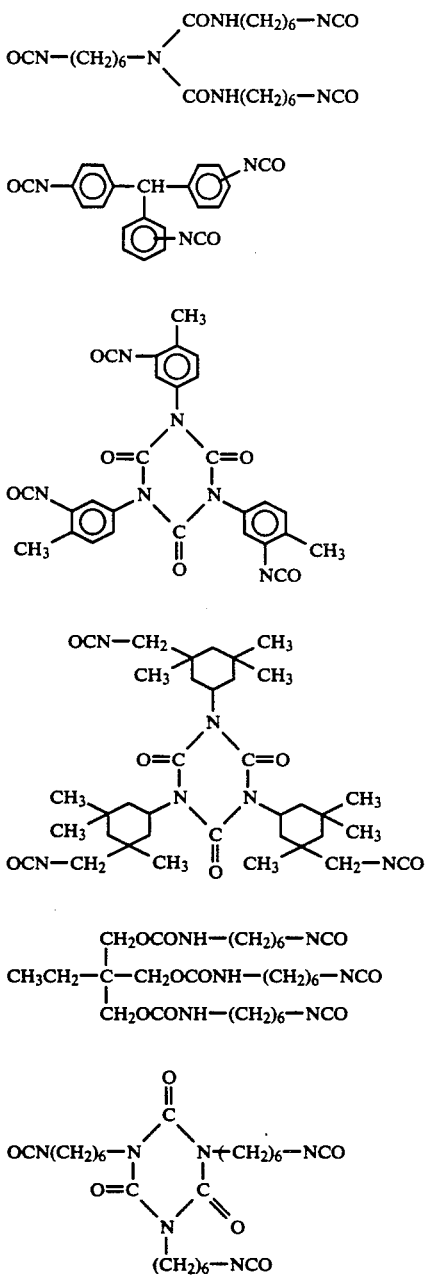

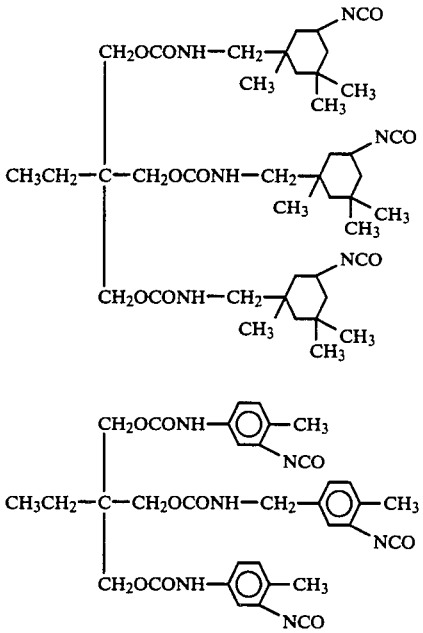

The resulting blend of condensation polymer and blocked polyisocyanate can be applied on a substrate. After application, the blocked polyisocyanate can be thermally deblocked and reactive isocyanates generated. The isocyanates may in turn crosslink the urethane groups of the condensation polymer thereby generating allophanate and biuret linkages. The resulting crosslinked polymer is, of course, more durable.

As already indicated, the urethane compositions of the invention are highly effective for imparting oil and water repellent properties to substrates to which they are applied and coatings of these polymers may be prepared by any of the well-known techniques. When prepared by bulk or suspension polymerization techniques, these urethane compositions can be applied, for example, from a dilute solution in a suitable solvent such as the fluroralkanes, fluorochloroalkanes, fluoroalkanoic acids, chlorinated alkanes or aromatics, hydrocarbon aromatics, ketones, ester and others. Concentrations of the fluorinated polymer in the solvent can be adjusted to provide an amount of urethane composition deposited on the substrate sufficient to provide oil and water repellency. This amounts typically to a deposit of from 0.01 to 10%, preferably from 0.1 to 1%, of urethane composition based on the weight of substrate. If the urethane composition is obtained as an aqueous latex or emulsion, the system can be diluted with water or other appropriate diluent to similarly provide an amount of urethane ranging from 0.01 to 10% of the weight of substrate deposited thereon.

The urethane solution or latex may be applied by any of the known techniques such as by dipping, spraying, brushing, padding, roll coating or by any desired combination of such techniques. The optimum method of application will depend principally on the type of substrate being coated.

Coatings of the urethane compositions of the invention may be applied to any desired substrate, porous or non-porous. They are particularly suited for application to porous materials such as textiles, leather, paper, wood, masonry, unglazed porcelain and the like to provide valuable oil and water repellency properties. However, they may also be applied to non-porous materials such as metals, plastics, glass, painted surfaces and the like to provide similar oil and water repellency properties. More specifically the urethane compositions of the invention act as leveling, wetting and spreading agents in formulations designed for application to floors, furniture and automobiles. In such applications a protective oil and water repellent film is left on the treated object after the removal of the bulk of the material. Such leveling, wetting, spreading and film forming properties are also useful in a. formulations for cleaning glass and other hard, non-porous materials b. hair care products such as rinses, shampoos and hair sprays c. paint, stain and varnish formulations for application to wood, masonry and ceramics.

In the treatment of paper the urethane compositions may be present as an ingredient in a wax, starch, casein, elastomer, or wet strength resin formulation. Aqueous emulsions of the urethane compositions are especially useful in the treatment of paper. By mixing the urethane compositions in an aqueous or oil type paint formulation, it may be applied effectively to unpainted asbestos siding, wood, metal and masonry. In the treatment of floors and tile surfaces and like substrates, urethane compositions may be applied by their incorporation in an emulsion or solution.

Because of the ability of the surfaces treated with these urethane compositions to withstand abrasive action the advantages incident to the repellency to oil and water and their resistance to soiling imparted by coating them with the urethane compositions of this invention, preferred classes of articles to be treated are papers and textiles. Illustrative papers are carbonizing tissue, wallpaper, asphalt laminates, liner board, cardboard and papers derived from synthetic fibers.

For application to textile materials such as fabrics woven and non-woven, fibers, films, yarns, cut staple, thread etc. or articles made form fabrics, fibers, films, yarns, etc. the urethane compositions of the invention are preferably prepared as aqueous latices or emulsions which are then diluted, preferably with water and applied to the textiles from pad baths which may contain other treating materials. In accordance with this technique, the fabric or the textile material is passed through the batch, passed through squeeze rolls adjusted to leave the desired amount of the latex on the fabric, dried at a temperature of about 25° C. to 125° C. and then cured in a curing oven at a temperature in the range from 120° C. to 195° C. for 0.2 to 20 minutes. The weight of urethane composition deposited on the fabric may range from 0.01 to 10% of the weight of fabric. Preferably, very small amounts are used in the range of 0.1 to 1%, often from 0.1 to 0.5% to give high degree of water and oil repellency. Any types of textile materials, such as cotton, wool, fiber glass, silk, regenerated cellulose, cellulose esters, cellulose ethers, polyesters, polyamides, polyolefins, polyacrylonitrile, polyacrylic esters, inorganic fibers, etc. either along or blended in any combination may be successfully coated with the urethane compositions of the invention. The resulting textile material will be found to be repellent to water and oil, and the textile material will retain its resistance to such agents even after many launderings and dry cleanings.

It will be often advantageous to use the urethane compositions of the invention in combination with conventional finishes, such as mildew preventatives, moth resisting agents, crease resistant resins, lubricants, softeners, fat liquors, sizes, flame retardants, antistatic agents, dye fixatives and water repellents.

TEST METHODS

The AATCC water spray test rating was determined according to Standard Test method 22-1985 of the American Association of Textile Chemists and Colorists, Volume 61, 1986 (also designated ASTM-583-58). Ratings are given from 0 (minimum) to 100 (maximum).

The AATCC Oil Rating was determined according to Standard Test method 118-1983 of the American Association of Textile Chemists and Colorists. Ratings are given from 0 (minimum) to 8 (maximum). A commonly accepted level of repellency for oil repellent fabrics in the United States is an oil repellency of 4.

All mentioned AATCC Tests are listed in the Technical manual of the American Association of Textile Chemists and Colorists, Volume 61, edition 1986.

Polymers and polymer blends dissolved in non-aqueous medium may be applied to fabric by known methods such as padding or spraying processes. The fabric is cured at 180° C. for 2 minutes.

Polymers and polymer blends prepared in water or a water-solvent mixture or a solvent which are water-miscible may be applied to polyester-cotton twill by padding from an aqueous pad bath containing also permanent press resins, catalyst and additives (so-called permanent press recipe).

After the padding, the fabric is dried at 100° C. for 2 minutes and cured at 163° C. for 5 minutes.

In the following Examples, $R_f$ denotes a linear perfluoroalkyl group of 6 to 12 carbon atoms with an average chain length of $C_9F_{19}$.

EXAMPLE 1

To a 1 liter jacketed flask equipped with an overhead stirrer, condenser and nitrogen inlet were charged 50.00 g (0.0423 moles) $(HOCH_2)_2C(CH_2SCH_2CH_2R_f)_2$ and 92.85 g isopropyl acetate. The mixture was stirred and heated under nitrogen at reflux (85° C. -90° C.) to remove 17.85 g solvent, and then cooled to 80° C. Approximately 4.79 g (0.0282 moles) 1,6-hexamethylene diisocyanate, 5.65 g isopropyl acetate and 0.17 g (0.0004 moles) stannous octoate were added. The reaction mix was heated at 80° C. for 2.5 hours, at which time all isocyanate was consumed as determined by I. R. Then 4.79 g (0.0282 moles) 1,6-hexamethylene diisocyanate and 7.19 g isopropyl acetate were added and the reaction mix was heated at 80° C. for an additional 30 minutes. A solution of 23.07 g (0.0141 moles) of a siloxane diamine

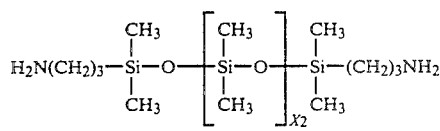

average $X_2 = 19$ and 34.60 g isopropyl acetate was added to the reaction flask during a 15-30 minute period to give the final polymer solution at 42.4% solids. (Infrared analysis showed that all isocyanate was consumed.) The mol ratio of diol (A): diisocyanate (B): siloxane diamine (C) used was 3:4:1. Characterization of the final polymer by Gel Permeation Chromatography (GpC) gave an Mw of $2.3 \times 10^4$ relative to polystyrene.

EXAMPLES 2–6

Examples 2–6 were synthesized according to the procedure described in Example 1.

| Example | Diisocyanate (B) | Molar Composition[1] A:B:C | Mw $\times$ $10^4$ [2] |
|---|---|---|---|
| 2 | 1,6-hexamethylene diisocyanate | 3:5:2 | 3.0 |
| 3 | 1,6-hexamethylene diisocyanate | 3:6:3 | 4.6 |
| 4 | 1,6-hexamethylene diisocyanate | 3:7:4 | — |
| 5 | 1,6-hexamethylene diisocyanate | 4:8:4 | — |
| 6 | 2,2,4- and 2,4,4-trimethylhexamethylene diisocyanate | 3:5:2 | 4.2 |

[1] A = $(HOCH_2)_2C(CH_2SCH_2CH_2R_f)_2$
B = Diisocyanate

C =

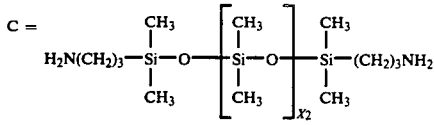

average $X_2 = 19$

[2] Determined by Gel Permeation Chromatography relative to polystyrene.

EXAMPLE 7

Approximately 100 g (0.0845 moles) $(HOCH_2)_2C(CH_2SCH_2CH_2R_f)_2$ and 185.71 g isopropyl acetate were added to a 1 liter jacketed flask equipped with an overhead stirrer, condenser and nitrogen inlet. The solution was stirred and heated under nitrogen at reflux (85° C.–90° C.) to remove 35.71 g solvent. Upon cooling the mixture to 80° C., 10.76 g (0.0633 mole) 1,6-hexamethylene diisocyanate, 12.99 g isopropyl acetate and 0.35 g (0.0009 moles) stannous octoate were charged. The entire mixture was then heated at 80° C. for 2.5 hours. Infrared analysis confirmed that all isocyanate was consumed. An additional 10.76 g (0.0633 moles) 1,6-hexamethylene diisocyanate was added followed by 16.14 isopropyl acetate. After heating the reaction mixture 32 minutes at 80° C., a solution of 101.53 g (0.0422 moles) of a siloxane diamine

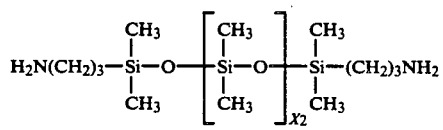

average $X_2 = 29$ and 152.29 g isopropyl acetate was added over 37 minutes to give the final polymer solution at 40.5% solids. The mole ratio of diol (A): diisocyanate (B): siloxane amine (C) was 4:6:2. The Mw of the final polymer was $2.6 \times 10^4$ as determined by GPC relative to polystyrene.

EXAMPLE 8

Example 7 was repeated but the 1,6-hexamethylene diisocyanate was substituted with an equimolar amount of isophorone diisocyanate. A final polymer solution at 41.5% solids was obtained. The mole ratio of diol (A): diisocyanate (B): siloxane diamine (C) was again 4:6:2. The Mw of the final polymer was found to be $2.6 \times 10^4$ by GPC relative to polystyrene.

EXAMPLE 9

Using the apparatus set-up described in Example 1, 100.00 g (0.0845 moles) $(HOCH_2)_2C(CH_2SCH_2CH_2R_f)_2$ and 185.71 g isopropyl acetate were added to the flask. Under nitrogen, the mix was stirred and heated at reflux (85° C..-90° C.) to remove 35.71 g solvent. The solution was then cooled to 80° C. To this were charged 10.76 g (0.0633 moles) 1,6-hexamethylene diisocyanate, 12.99 g isopropyl acetate and 0.35 g (0.0009 moles) stannous octoate. The reaction mixture was then heated at 80° C. for 2.6 hours at which time no unreacted isocyanate was detectable by I.R. Approximately 10.76 g (0.0633 moles) 1,6-hexamethylene diisocyanate and 16.14 g isopropyl acetate were then charged and the reaction mix was held at 80° C. for 35 minutes. To this were added a solution of 97.51 g (0.0423 moles) of a siloxane diol

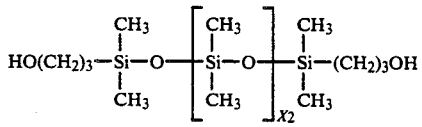

average $X_2 = 28$ and 146.27 g isopropyl acetate over a 36 minute period. Upon addition completion, the reaction mix was held at 80° C. for 40 minutes. Then 0.08 g (0.0002 moles) stannous octoate was added and the mix was heated at 80° C. for an additional 55 minutes. All isocyanate was consumed based on infrared analysis. The final polymer solution was at 40.1% solids and contained diol (A): diisocyanate (B): siloxane diol (C) in a mol ratio of 4:6:2. GPC analysis gave an Mw of $2.1 \times 10^4$ for the final polymer relative to polystyrene.

EXAMPLE 10

To 10.00 g 70° C. polymer solution from Example 2 was added 2.22 g blocked polyisocyanate IPDI-B1370 from Huels. The mixture was stirred to obtain a homogeneous solution.

EXAMPLE 11 the polymer solutions of Examples 2, 6, 7, 8, 9 and 10 were applied to cotton at 0.18% F add-on on the fabric from dilute isopropyl acetate solutions, as described in the Testing Methods section.

| | Repellency: AATCC | | | | | |
|---|---|---|---|---|---|---|
| | Initial | | Washed | | Dry Cleaned | |
| Ex. No. | Oil | Water | Oil | Water | Oil | Water |
| 2 | 5 | 100 | 4 | 50− | 5 | 90− |
| 6 | 4 | 90− | 2 | 50 | 4 | 70+ |
| 7 | 4 | 100 | 3 | 50 | 4 | 90+ |
| 8 | 4 | 90 | 1 | 50 | 4 | 70+ |
| 9 | 5 | 100 | 4–5 | 0 | 5 | 90− |
| 10 | 5 | 100 | 4 | 90− | 5 | 100 |

EXAMPLE 12

The polymer solutions of Examples 2, 6, 7, 8, 9 and 10 were applied to nylon at an add-on level of 0.04% F, according to the procedure given in "Test Methods."

|         | Repellency: AATCC |       |        |       |             |       |
|---------|-------|-------|--------|-------|-------------|-------|
|         | Initial |     | Washed |       | Dry Cleaned |       |
| Ex. No. | Oil   | Water | Oil  | Water | Oil         | Water |
| 2       | 2     | 100   | 2    | 100−  | 2           | 100   |
| 6       | 5     | 100   | 4    | 100   | 4-5         | 100   |
| 7       | 2     | 100   | 2    | 100−  | 2           | 100   |
| 8       | 3-4   | 100   | 2    | 100−  | 2           | 100   |
| 9       | 4     | 100   | 2    | 70    | 2-3         | 100   |
| 10      | 5     | 100   | 5    | 100   | 5           | 100   |

EXAMPLE 13

To a 1 liter jacketed reactor equipped with an overhead stirrer, condenser and nitrogen inlet is added 80.00 g (0.0676 moles) $(HOCH_2)_2C(CH_2SCH_2CH_2R_f)_2$ and 148.57 g ethylene glycol dimethyl ether. The mix is heated under nitrogen at reflux (84° C.-87° C.) to remove 28.57 g solvent, and then cooled to 80° C. To this is added 8.54 g (0.0507 moles) hexamethylene diisocyanate, 10.04 g ethylene glycol dimethyl ether, and a solution of 0.31 g (0.0008 moles) stannous octoate in 2.77 g ethylene glycol dimethyl ether. The reaction mixture is heated at 80° C. for 2.5 hours. IR analysis shows that all isocyanate is consumed. Then 5.7 g (0.0338 moles) hexamethylene diisocyanate and 8.7 g ethylene glycol dimethyl ether are added and the mixture is heated at 80° C. for 1.5 hours. The entire 80° C. reaction mixture is then added to a 52° C. solution of 9.88 g (0.0020 moles) of

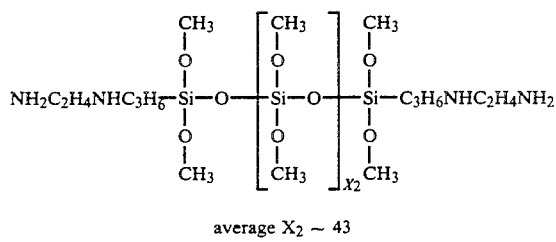

average $X_2 \sim 43$ and 39.52 g (0.0164 moles) of

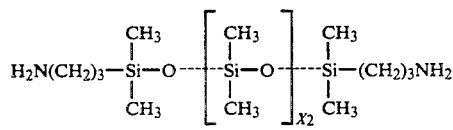

average $X_2 \sim 29$ and 74.10 g methyl isobutyl ketone over a period of 37 minutes, yielding the final polymer solution at 40–42% solids. The mol ratio of diol (A): diisocyanate (B): siloxane diamine (C) used is 4:5:1. The Mw of the final polymer is $2.2 \times 10^4$ relative to polystyrene as determined by Gel Permeation Chromatography (GPC).

EXAMPLE 14

Approximately 80.00 g (0.0676 moles) $(HOCH_2)_2C(CH_2SCH_2CH_2R_f)_2$ and 148.57 g isopropyl acetate is added to a 1 liter flask set-up described in Example 1. The solution is stirred and heated under nitrogen at reflux (85° C.-90° C.); 28.57 g solvent is removed. Upon cooling the mixture to 80° C., 8.54 g (0.0507 moles) hexamethylene diisocyanate, 10.04 g isopropyl acetate, and a solution of 0.31 g (0.0008 moles) stannous octoate in 2.77 g isopropyl acetate is added. The entire reaction mix is heated at 79° C.-80° C. for 2.7 hours, at which time all isocyanate is consumed as determined by infrared analysis. To the mix is added 10.82 g (0.0642 moles) hexamethylene diisocyanate and 16.23 g isopropyl acetate. After heating the reaction mixture at 78° C.-80° C. for 55 minutes, 1.61 g (0.0135 moles) N-methyldiethanolamine and 2.42 g isopropyl acetate are added. The mix is further heated at 80° C. for 1.5 hours. 1.74 g (0.0103 moles) hexamethylene diisocyanate is then added. The entire 80° C. reaction mixture is added to a 49° C.-50° C. solution of 81.29 g (0.0338 moles) of

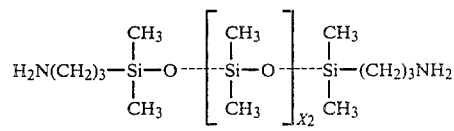

average $X_2 \sim 29$ and 121.94 g isopropyl acetate over a 17 minute period, to give the final polymer solution at 44% solids. The mol ratio of diol (A): diisocyanate (B): siloxane diamine (C) is 4.8:6.8:2. The Mw of the final polymer is $4.0 \times 10^4$ as determined by GPC, relative to polystyrene.

Then 20.00 g polymer solution is cooled to 70° C. To this is added 4.60 g blocked polyisocyanate IPDI-B1370 from Huels, and the mixture is stirred to obtain a homogeneous solution.

EXAMPLE 15

The polymer solutions of Examples 1, and 2 are applied to cotton at 0.12% F add-on on the fabric from dilute ethyl acetate solutions, as described in the Testing Methods section.

|         | Repellency: AATCC |       |        |       |             |       |
|---------|-------|-------|--------|-------|-------------|-------|
|         | Initial |     | Washed |       | Dry Cleaned |       |
| Ex. No. | Oil   | Water | Oil  | Water | Oil         | Water |
| 1       | 1     | 80+   | 0    | 0     | 1           | 70+   |
| 2       | 4.5   | 100   | 4    | 50    | 4           | 100   |

EXAMPLE 16

The polymer solutions of Examples 1 and 2 are applied to nylon at an add-on level of 0.06% F, from dilute ethyl acetate solutions according to the procedure given in "Test Methods."

|         | Repellency: AATCC |       |        |       |             |       |
|---------|-------|-------|--------|-------|-------------|-------|
|         | Initial |     | Washed |       | Dry Cleaned |       |
| Ex. No. | Oil   | Water | Oil  | Water | Oil         | Water |
| 1       | 0     | 100   | 0    | 50    | 0           | 100   |
| 2       | 2     | 100   | 1    | 90    | 1           | 100   |

What is claimed is:

1. A urethane containing polymer comprising about 5% to about 70% by weight of perfluoroalkyl containing segments of bis-$R_f$ containing neopentyleneoxy units and about 20-95% by weight of siloxane segments, wherein the perfluoroalkyl containing segment is selected from those of the structure:

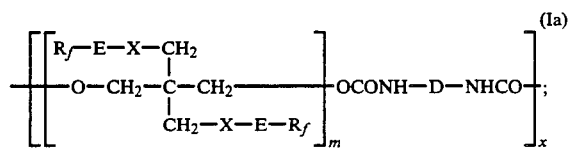

and the siloxane-containing segment is selected from those of the structure:

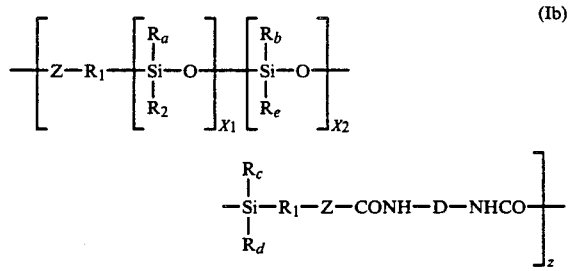

wherein $R_f$ is a straight or branched chain perfluoroalkyl up to 18 carbon atoms or said perfluoroalkyl substituted by perfluoroalkoxy of 2 to 6 carbon atoms, or mixtures thereof;

E is straight or branched chain alkylene of 1 to 10 carbon atoms or said alkylene interrupted by one to three groups independently selected from the group consisting of —NR—, —O—, —S—, —COO—, —OOC—, —CONR—, —NRCO—, —SO$_2$NR— and NRSO$_2$—, or attached at the $R_f$ end with —CONR— or —SO$_2$NR— where such $R_f$ is attached to the respective carbonyl carbon or sulfur atom thereof and X is —S—, —O—, SO$_2$— or —NR—; or E is a direct bond and X is —CONR— or —SO$_2$NR where $R_f$ is attached to the respective carbonyl carbon or sulfur atom thereof; and R is independently hydrogen, alkyl of 1 to 6 carbon atoms or hydroxyalkyl of 2 to 6 carbon atoms; m is 1-3 and x is 1 to 20; Z is —)—, —S— or —NR$_4$— where R$_4$ is hydrogen or lower alkyl; R$_1$ is straight or branched chain alkylene of up to 6 carbon atoms which may be interrupted by —N(R)— where R is as defined hereinabove or is a polyoxyalkylene group of the formula —(alk—O)$_f$—alk— where alk is straight or branched chain alkylene of 2 to 4 carbon atoms and f is an integer of 1 to about 50. R$_2$, R$_a$, R$_b$, R$_c$, R$_d$ and R$_e$ are straight or branched chain alkyl of up to 18 carbon atoms, alkoxy of up to 5 carbon atoms, phenyl or aralkylene of 7 to 19 carbon atoms; X$_1$ and X$_2$ are integers from 1 to 500 with the proviso that X$_1$+X$_2$ is 5 to 1300; and z is 1 to 20;

and D is the residue of an aromatic, aliphatic, cycloaliphatic or araliphatic diisocyanate.

2. A polymer according to claim 1 wherein $R_f$ is a mixture of perfluoroalkyl of 4 to 18 carbon atoms.

3. A polymer according to claim 2 wherein $R_f$ contains 4 to 12 carbon atoms, E is alkylene of 2 to 6 carbon atoms, —CONHCH$_2$CH$_2$—, —CH$_2$CH$_2$N(CH$_3$)CH$_2$CH$_2$—, —CH$_2$CH$_2$SO$_2$NHCH$_2$CH$_2$—, —CH$_2$CH$_2$OCH$_2$CH$_2$—, or -13 SO$_2$NHCH$_2$CH$_2$—, X is —S—, —SO$_2$— or —O—, and m is 1 or 2.

4. A polymer according to claim 2 wherein $R_f$ is perfluoroalkyl of 6 to 12 carbon atoms, E is ethylene, m=1, and X is S.

5. A polymer according to claim 2 wherein $R_f$ is perfluoroalkyl of 6 to 12 carbon atoms, E is ethylene, m=2, and X is S.

6. A polymer according to claim 1 wherein D is the residue of an aliphatic or cycloaliphatic isocyanate of up to 16 carbon atoms.

7. A polymer according to claim 2 wherein D is the residue of an aliphatic or cycloaliphatic isocyanate of up to 16 carbon atoms.

8. A polymer according to claim 3 wherein D is the residue of an aliphatic or cycloaliphatic isocyanate of up to 16 carbon atoms.

9. A polymer according to claim 1 wherein, R$_2$, R$_a$, R$_b$, R$_c$, R$_d$ and R$_e$ are alkyl of 1 to 4 carbon atoms or alkoxy of up to 5 carbon atoms, R$_1$ is alkylene of up to 6 carbon atoms which may be interrupted by —N(R)— and X$_1$+X$_2$ is 5 to 100.

10. A polymer according to claim 2 wherein, R$_2$, R$_a$, R$_b$, R$_c$, R$_d$ and R$_e$ are alkyl of 1 to 4 carbon atoms or alkoxy of up to 5 carbon atoms, R$_1$ is alkylene of up to 6 carbon atoms which may be interrupted by —N(R)— and X$_1$+X$_2$ is 5 to 100.

11. A polymer according to claim 3 wherein, R$_2$, R$_a$, R$_b$, R$_c$, R$_d$ and R$_e$ are alkyl of 1 to 4 carbon atoms or alkoxy of up to 5 carbon atoms, R$_1$ is alkylene of up to 6 carbon atoms which may be interrupted by —N(R)— and X$_1$+X$_2$ is 5 to 100.

12. A polymer according to claim 6 wherein, R$_2$, R$_a$, R$_b$, R$_c$, R$_d$ and R$_e$ are alkyl of 1 to 4 carbon atoms or alkoxy of up to 5 carbon atoms, R$_1$ is alkylene of up to 6 carbon atoms which may be interrupted by —N(R)— and X$_1$+X$_2$ is 5 to 100.

13. A polymer according to claim 7 wherein, R$_2$, R$_a$, R$_b$, R$_c$, R$_d$ and R$_e$ are alkyl of 1 to 4 carbon atoms or alkoxy of up to 5 carbon atoms, R$_1$ is alkylene of up to 6 carbon atoms which may be interrupted by —N(R)— and X$_1$+X$_2$ is 5 to 100.

14. A polymer according to claim 8 wherein, R$_2$, R$_a$, R$_b$, R$_c$, R$_d$ and R$_e$ are alkyl of 1 to 4 carbon atoms or alkoxy of up to 5 carbon atoms, R$_1$ is alkylene of up to 6 carbon atoms which may be interrupted by —N(R)— and X$_1$+X$_2$ is 5 to 100.

15. A blend of the urethane containing polymer according to claim 1 and an effective crosslinking amount of a blocked organic polyisocyanate crosslinking agent.

16. A blend of the urethane containing polymer according to claim 14 and an effective crosslinking amount of a blocked organic polyisocyanate crosslinking agent.

17. A polyamide or cellulosic textile fabric treated with an oleophobic and hydrophobic amount of a cured blend of the composition according to claim 15.

18. A polyamide or cellulosic textile fabric treated with an oleophobic and hydrophobic amount of a cured blend of the composition according to claim 16.

* * * * *